United States Patent Office 3,520,912
Patented July 21, 1970

3,520,912
SULFENYLDIAMIDE FUNGICIDES
Ernst-Heinrich Pommer, Limburgerhof, Pfalz, and Guenther Weiss and Gerhard Schulze, Ludwigshafen (Rhine), Germany, assignors to Badische Anilin- & Soda-Fabrik Aktiengesellschaft, Ludwigshafen (Rhine), Germany
No Drawing. Filed Sept. 30, 1966, Ser. No. 583,446
Claims priority, application Germany, Oct. 6, 1965, 1,300,726
Int. Cl. C07c *143/80;* A01n *9/16*
U.S. Cl. 260—453          6 Claims

ABSTRACT OF THE DISCLOSURE

Compounds having the formula $$R^2-\underset{R_1}{N}-SO_2-\underset{R^3}{N}-S-CCl_2F$$

in which $R^1$ denotes an unsubstituted phenyl or naphthyl radical, $R^2$ denotes a lower alkyl radical and $R^3$ denotes a lower alkyl radical. These compounds have been found to have excellent fungicidal activity.

---

The present invention relates to new sulfenyldiamides, particularly compounds which contain the monofluorodichloromethylthio radical. The compounds have a strong action against fungi and are suitable for controlling fungi in agriculture and industry.

An object of the invention is to provide new sulfenyldiamides which contain the monofluorodichloromethylthio radical. Another object of the invention is a process for controlling fungi with these compounds.

It is known that derivatives of sulfenyldiamides having the general formula $$R^2-\underset{R^1}{N}-SO_2-\underset{R^3}{N}-S-CCl_2F$$

in which $R^1$ denotes an alkyl radical, $R^2$ denotes an alkyl radical and $R^3$ denotes an alkyl or aryl radical have fungicidal activity (British patent specification No. 927,834). Their action is, however, not satisfactory.

We have found that compounds having the general formula $$R^2-\underset{R^1}{N}-SO_2-\underset{R^3}{N}-S-CCl_2F$$

in which $R^1$ denotes an unsubstituted or substituted phenyl or naphthyl radical, $R^2$ denotes a lower alkyl radical and $R^3$ denotes a lower alkyl radical have good fungicidal action.

The fungicides according to this invention have a broad spectrum and may be used for controlling a great variety of injurious fungi, for example mold fungus, downy mildew, common powdery mildew and Botrytis.

The active ingredients may be prepared in a simple way by reaction of the corresponding trichloro compounds having the general formula $$R^2-\underset{R^1}{N}-SO_2-\underset{R^3}{N}-S-CCl_3$$

in which $R^1$, $R^2$ and $R^3$ have the meanings given above with hydrogen fluoride. Alternatively trisubstituted sulfonyldiamides having the general formula $$R^2-\underset{R^1}{N}-SO_2-\underset{R^3}{N}-H$$

in which $R^1$, $R^2$ and $R^3$ have the meanings given above may be reacted with monofluorodichloromethylsulfenyl chloride, or monoalkylamidosulfonyl chlorides and monofluorodichloromethylsulfenyl chloride may be allowed to act on secondary aromatic or cycloaliphatic amines, advantageously in the presence of a component which binds hydrogen chloride.

The method of preparing N,N'-dimethyl-N-phenyl-N'-dichlorofluoromethylmercaptosulfonyl diamide is given by way of example. 160 parts (by weight) of hydrogen fluoride (98 to 99% by weight) is added at 0° C. to 35 parts of N,N'-dimethyl-N-phenyl-N'-trichloromethylmercaptosulfonyl diamide (manufactured according to the process of German patent specification 1,188,582 by reacting N-methylamidosulfonyl chloride, trichloromethylsulfonyl chloride and N-methylaniline in solution in benzene and in the presence of triethylamine and by evaporating the benzene after the reaction). The mixture is then kept at 19° to 20° C. for fifty hours by cooling while stirring vigorously. The reflux condenser, which is sealed to atmospheric moisture, is kept at −20° C. by cooling during the course of the whole reaction. When the reaction is finished the mixture is poured on to ice and the resulting psecipitate is suction filtered and washed with water. 29 g. of N,N'-dimethyl - N - phenyl-N'-dichlorofluoromethylmercaptosulfonyl diamide (melting point 51° C.) is obtained.

The active ingredients may be processed in conventional manner by adding extenders, solvents, emulsifiers or other assistants for example hydrocarbons, water, clay, diatomaceous earth or alkylphenyl sulfonates into suspensions, solutions, emulsifiable concentrates, granulates and dusts and used in these forms. They may also be used together with other plant protection agents.

The good fungicidal properties of the compounds according to this invention will be evident from the following examples in which the following active ingredients are used:

(A) Phenyl—N(CH$_3$)—SO$_2$—N(C$_2$H$_5$)—SCCl$_2$F (B) Phenyl—N(CH$_3$)—SO$_2$—N(C$_4$H$_9$ normal)—SCCl$_2$F (C) Phenyl—N(C$_2$H$_5$)—SO$_2$—N(CH$_3$)—SCCl$_2$F (D) Phenyl—N(CH$_3$)—SO$_2$—N(CH$_3$)—SCCl$_2$F (E) Naphthyl—N(C$_2$H$_5$)—SO$_2$—N(CH$_3$)(SCCl$_2$F)

and in which the following prior art active ingredient is used for purposes of comparison:

(Com) Phenyl—N(CH$_3$)—SO$_2$—N(CH$_3$)—SCCl$_2$F

EXAMPLE 1

The active ingredients are added in varying amounts, graduated down to 0.1 part per million parts of nutrient solution, to a nutrient solution having optimum suitability for the growth of the fungus *Aspergillus niger*. 20 ml. of the nutrient solution thus treated is inoculated with 0.3 mg. of Aspergillus fungus spores in a 100 ml. Erlenmeyer flask. The flasks are heated for 120 hours at 36° C. and then the extent of the development of the fungus (which takes place preferentially on the surface of the nutrient solution) is judged.

In the following Table 1, 0 denotes no fungus growth graduated up to 5 which denotes uninhibited fungus growth (the surface of the nutrient solution being completely covered by fungus).

TABLE 1

| Active ingredient | Amount of active ingredient in the nutrient medium in parts per million parts of nutrient medium | | | |
|---|---|---|---|---|
| | 5 | 1 | 0.5 | 0.1 |
| (A) | 0 | 0 | 3 | 4 |
| (B) | 0 | 0 | 2 | 3 |
| (C) | 0 | 0 | 2 | 3 |
| (Comp) | 0 | 3 | 4 | 5 |
| Control (untreated) | 5 | 5 | 5 | 5 |

EXAMPLE 2

Leaves of potted vines of the variety Müller-Thurgau are sprayed with aqueous dispersions which contain 80% of active ingredient and 20% of sodium lignin sulfonate on the dry substance. Sprays having a strength of 0.05 and 0.025% (on the dry substance) are used. After the sprayed coating has dried, the leaves are infected with a zoospore suspension of *Plasmopara viticola*. The plants are then placed first for sixteen hours in a moist chamber saturated with water vapour at 20° C. and then for eight days in a greenhouse at temperatures of from 20° to 30° C. To accelerate and intensify the outbreak of sporangiophores, the plants are again placed in the moist chamber for sixteen hours. The spore sites on the underside of the leaves are then counted. An untreated infected control plant is used as a comparison. The results are given in the following Table 2:

TABLE 2

| Active ingredient | Percentage of leaves attacked after spraying with a spray having the strength | |
|---|---|---|
| | 0.05% | 0.025% |
| (D) | 0 | 0 |
| (B) | 0 | 2 |
| (E) | 1 | 3 |
| (Comp) | 3 | 5 |
| Control (untreated) | 100 | 100 |

EXAMPLE 3

The following Table 3 gives the inhibition values in relation to *Botrytis cinerea*. The active ingredients are thoroughly mixed in increasing concentrations from 0.01 to 0.05% with a malt agar. The agar is poured into Petri dishes having a diameter of 9 cm.; after the agar has solidified, the dishes are inoculated in the centre with mycelium flakes of *Botrytis cinerea*. The dishes are incubated at 22° to 25° C. and eight days later the extent of the development of the fungus colony is judged as compared with the untreated control. In the following Table 3, the extent of the development of the fungus colony is indicated as follows:

| | Diameter of fungus colony |
|---|---|
| 0 | No growth. |
| 1 | 1–2 cm. |
| 2 | 2–4 cm. |
| 3 | 4–5 cm. |
| 4 | 5–8 cm. |
| 5 | 9 cm. |

TABLE 3

| Active ingredient | Active ingredient present in the nutrient agar in the percentages | | |
|---|---|---|---|
| | 0.05 | 0.025 | 0.01 |
| (A) | 0 | 1 | 1 |
| (B) | 0 | 0 | 1 |
| (C) | 0 | 0 | 0 |
| (Comp) | 1 | 2 | 2 |
| Control (untreated) | 5 | 5 | 5 |

We claim:
1. A compound having the general formula

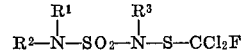

in which $R^1$ denotes an unsubstituted phenyl or naphthyl radical, $R^2$ denotes a lower alkyl radical and $R^3$ denotes a lower alkyl radical.

2. A compound as in claim 1 wherein $R^1$ is phenyl, $R^2$ is methyl, and $R^3$ is ethyl.

3. A compound as in claim 1 wherein $R^1$ is phenyl, $R^2$ is methyl, and $R^3$ is n-butyl.

4. A compound as in claim 1 wherein $R^1$ is phenyl, $R^2$ is methyl, and $R^3$ is methyl.

5. A compound as in claim 1 wherein $R^1$ is phenyl, $R^2$ is ethyl, and $R^3$ is methyl.

6. A compound as in claim 1 wherein $R^1$ is naphthyl, $R^2$ is ethyl, and $R^3$ is methyl.

References Cited

UNITED STATES PATENTS 2,844,628   7/1958   Kühle _____ 260—551

FOREIGN PATENTS 1,173,721   7/1964   Germany.

OTHER REFERENCES

Kühle et al.: Angew. Chem. 76(19): 807–16 (1964).

HENRY R. JILES, Primary Examiner

C. M. SHURKO, Assistant Examiner

U.S. Cl. X.R.

424—321